United States Patent [19]

Cole

[11] Patent Number: 5,256,036
[45] Date of Patent: Oct. 26, 1993

[54] METHOD AND APPARATUS FOR PUMPING A MEDIUM

[75] Inventor: James J. Cole, San Antonio, Tex.

[73] Assignee: Southwest Research Institute, San Antonio, Tex.

[21] Appl. No.: 685,233

[22] Filed: Apr. 11, 1991

[51] Int. Cl.⁵ .......................................... H02K 44/02
[52] U.S. Cl. .................................... 417/48; 417/50; 315/111.21; 313/231.31; 123/143 B
[58] Field of Search ............... 417/48, 49, 50; 315/111.21, 111.41; 313/231.31, 231.41; 431/2; 123/143 B

[56] References Cited

U.S. PATENT DOCUMENTS

| | | |
|---|---|---|
| 2,945,119 | 7/1960 | Blackman . |
| 3,243,954 | 4/1966 | Cann ........................ 313/231.41 |
| 3,361,353 | 1/1968 | Millman . |
| 3,934,566 | 1/1976 | Ward . |
| 3,963,408 | 6/1976 | Youngberg ..................... 431/2 |
| 4,051,826 | 10/1977 | Richards . |
| 4,347,825 | 9/1982 | Suzuki et al. . |
| 4,672,938 | 6/1987 | Hoppie et al. . |
| 4,710,681 | 12/1987 | Zivkovich .................... 431/2 |
| 4,766,855 | 8/1988 | Tozzi ........................ 123/143 B |
| 4,805,400 | 2/1989 | Knowles ..................... 60/203.1 |
| 5,076,223 | 12/1991 | Harden et al, ................ 123/143 B |

FOREIGN PATENT DOCUMENTS

| | | |
|---|---|---|
| 2594491 | 9/1987 | France . |
| 55-93953 | 7/1980 | Japan . |
| 58-220952 | 12/1983 | Japan . |

OTHER PUBLICATIONS

Article entitled *"Railplug Ignition Concept May Revolutionize Engine Design,"* Technology Forecasts (Aug. 1990).

Primary Examiner—Richard A. Bertsch
Assistant Examiner—David W. Scheuermann
Attorney, Agent, or Firm—Baker & Botts

[57] ABSTRACT

There is disclosed an apparatus and method for pumping a flowable medium. The pump forces a volume of medium out a pumping chamber by driving an induced plasma arc the length of the pumping chamber from inlet to outlet. An electric potential generated across the medium within the pumping chamber creates the plasma arc near the inlet of the chamber. An induced magnetic field then causes the plasma arc to travel from inlet to outlet thereby forcing the medium ahead of the plasma arc out of the chamber.

27 Claims, 3 Drawing Sheets

METHOD AND APPARATUS FOR PUMPING A MEDIUM

TECHNICAL FIELD OF THE DISCLOSURE

This invention relates in general to the field of pumps. More particularly, the present invention relates to an apparatus and method for electromagnetically pumping a flowable medium.

BACKGROUND OF THE DISCLOSURE

Modern processes and devices employ a wide variety of pumps to transport flowable media. Pumps historically have created pressure gradients in fluid or fluid-like fields by two methods. One way to pump a medium is by moving a solid surface such as a piston or impeller within the medium. The surface causes movement in the medium by directly imparting momentum from the moving surface to the medium or by creating a pressure difference ("lift") between two sides of an aerodynamic surface. Pumps such as these are limited by reliability, maintainability and flexibility constraints. A second way to pressurize a medium is to apply a pressurized fluid to the surface of the medium. Examples of this type of pump are air-lift or water-jet pumps. This second method, although involving few moving parts, is severely limited by the availability of plentiful steam, compressed air and the like, and is therefore limited to special circumstances.

Pump designers face several complications trying to increase reliability and decrease pump maintenance in piston/impeller configurations. It is axiomatic that an increase in the parts count of a system has an adverse effect on both objectives. This is especially true in fluid transport systems where drive shafts must be sealed against leakage, bearings must be accessible for service and impellers must operate in abrasive environments. Pump operating pressure also has an adverse impact on reliability and maintenance. High fluid pressures require closer part tolerances and necessarily imply higher internal stresses.

Current pump technology, both in piston/impeller and pressurized fluid configurations, results in pumps that are suitable for only a few media. Most rotating or reciprocating surfaces in a pump assembly are not suited for pumping semi-fluid media. Individual pumps, once designed for a particular flow rate, pressure rise and medium type, are ill-suited to most other combinations.

Therefore, a need has arisen for a multimedia pump that is operable at pressures up to several thousand pounds per square inch ("psi") with a high degree of reliability and with little required maintenance.

SUMMARY OF THE DISCLOSURE

In accordance with the present invention, a pump is provided that substantially eliminates or reduces disadvantages and problems associated with prior pumps.

An apparatus for pumping a flowable medium is disclosed. A plasma arc is generated in the medium orthogonal to the desired path of flow of the medium and then is caused to be moved along the desired path causing flow of the medium along that path. More specifically, the plasma arc is created between a cathode and anode running the length of the pump. An induced magnetic field orthogonal to both the plasma arc and to the desired flow direction causes the arc to move along the length of the pump.

Accordingly, it is one technical advantage to create a pump that is capable of pumping a variety of media, both fluid and semi-fluid.

It is another technical advantage to create a pump with no moving parts.

It is a further technical advantage of the invention to provide a pump capable of producing a high pressure output.

BRIEF DESCRIPTION OF THE DRAWINGS

A more complete understanding of the present invention may be acquired by referring to the detailed description and claims when considered in connection with the accompanying drawings in which like reference numbers indicate like features, wherein:

DETAILED DESCRIPTION OF THE DISCLOSURE

Figure 1:
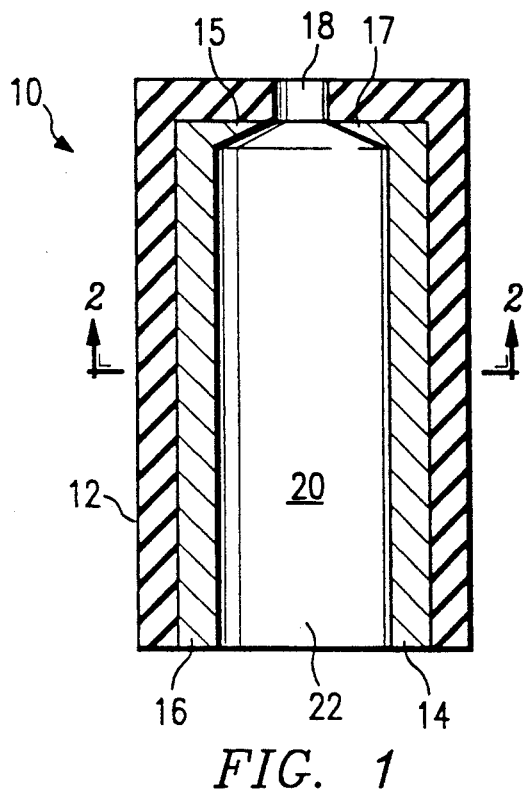
FIG. 1 discloses a cross-sectional view of a pump that is constructed in accordance with the invention.

FIG. 1 shows a pump 10 that is constructed in accordance with the invention. The pump 10 includes an insulating body 12. Located within the body 12 is an elongate anode 14 and an elongate cathode 16 that run the length of a pumping chamber 20. The medium to be pumped enters and exits the pump 10 through an inlet 18 and an outlet 22, respectively. Anode 14 includes a protrusion 15 and cathode 16 includes a protrusion 17 which extend towards one another at the inlet 18 but do not meet. Although the anode 14 and the cathode 16 predominantly parallel one another in the pumping chamber 20, the two could, for instance, uniformly diverge from one another throughout the chamber 20 without altering the operation of the pump 10.

Figure 2A:
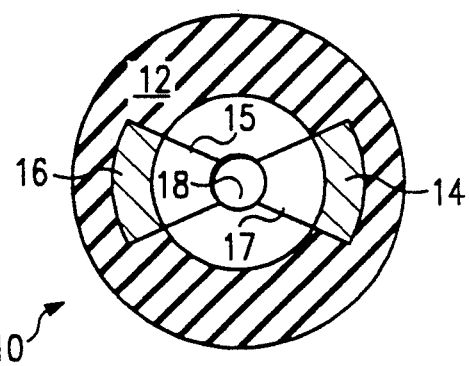
FIGS. 2a and 2b disclose a sectional view taken generally along the line 2—2 of FIG. 1.

FIG. 2a depicts a cross-sectional view of the pump 10. The discontinuity of the anode 14 and the cathode 16 is apparent in this upward view. Although the pumping chamber 20 is depicted as having a cylindrical shape, other geometrics are equally adaptable to the invention. For instance, chamber 20 could have a rectangular cross section. In FIG. 2a the two electrodes parallel one another. Other geometries and orientations can be employed. For example, multiple sets of electrodes could be used. The electrodes could also be arranged coaxially.

Figure 2B:
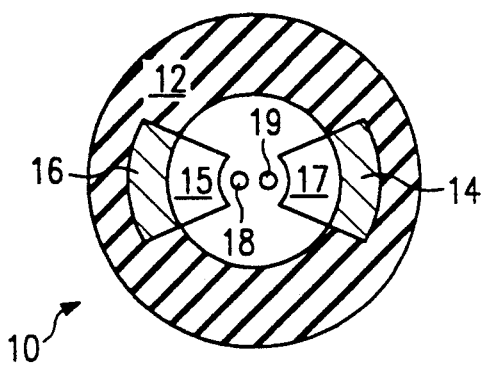

FIG. 2b depicts how two or more media could be introduced into and be pumped by the pump 10. A second inlet 19 allows a second medium into the chamber 20. Additional inlets could be similarly installed for additional media. The embodiment described in FIG. 2a is particularly suited for combining chemically reactive media such as fuel and oxidizer.

Figure 3:
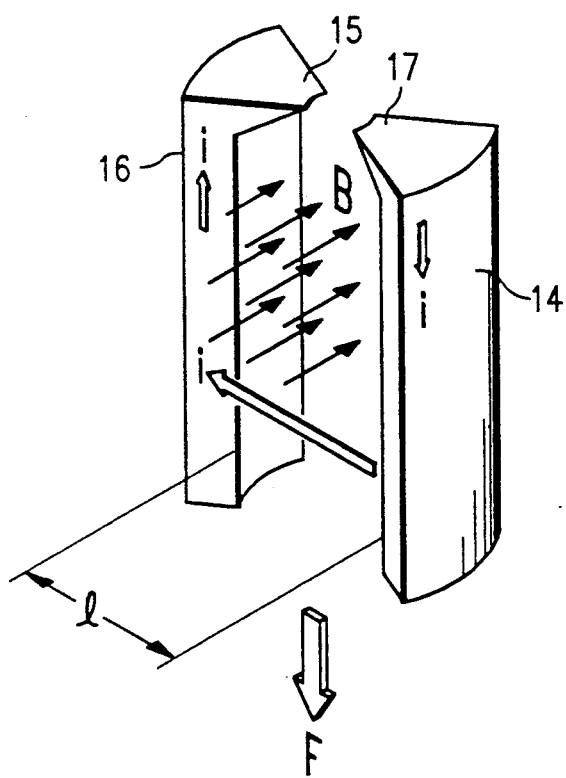
FIG. 3 discloses a schematic depiction of the electromagnetic forces acting within the pump of FIG. 1.

FIG. 3 shows the relative position of the anode 14, the cathode 16, the plasma arc or current "i" created in the medium by the two electrodes, the magnetic field "B" induced by the current i flowing in the electrodes, and the resultant force "F" that acts on the plasma arc within the pumping chamber 20. Force F moves the plasma arc from the inlet 18 to the outlet 22.

The movement of the plasma arc is governed by the Lorentz' effect. A simplified expression of the effect is given by the expression:

$$F = il \times B.$$

Where F is the resultant force on a current i of length l in a magnetic field B. F, l and B are vectors and x is the vector operand cross-product.

Figure 4A:
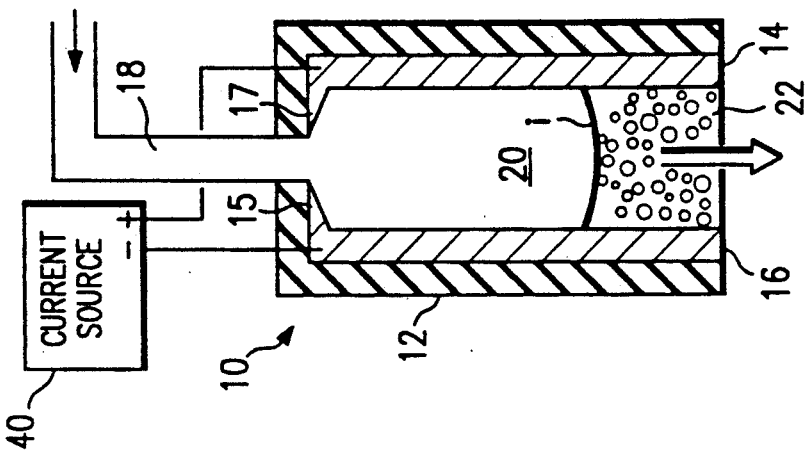
FIGS. 4a, 4b and 4c disclose a cross-sectional view of the pump of FIG. 1 depicting the operation of the pump.
Figure 4B:
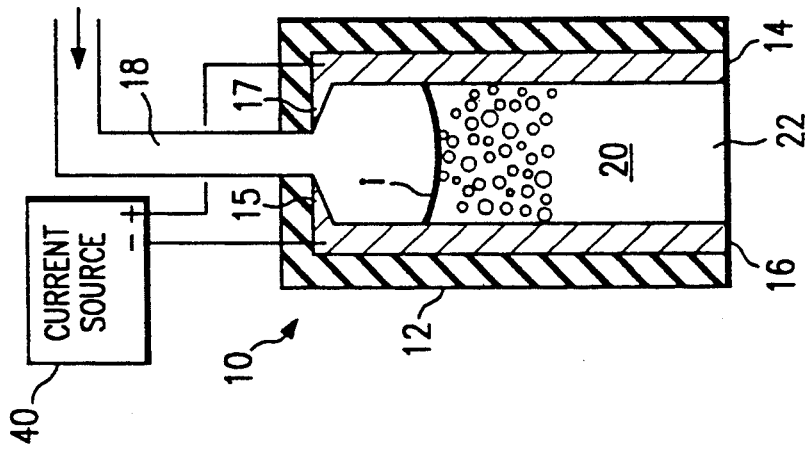
Figure 4C:
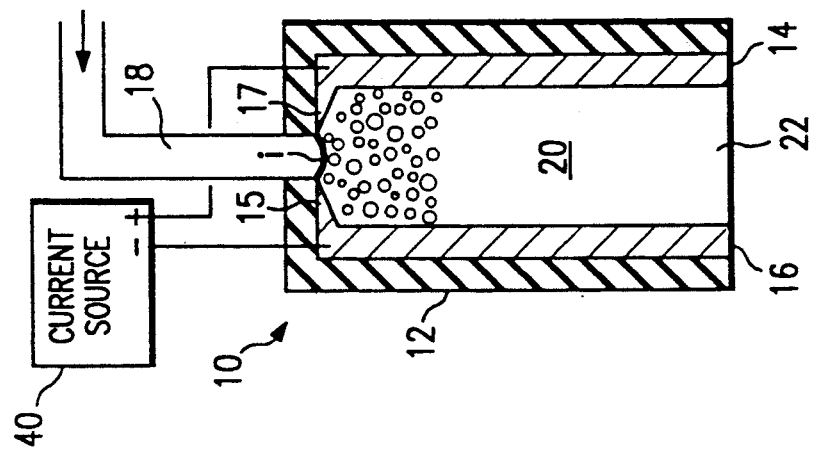

FIGS. 4a, 4b, and 4c depict the operation of the pump 10. The medium to be pumped is introduced into chamber 20 through the inlet 18 at a low pressure. Circuitry 40 generates a sufficiently high electrical potential between the anode 14 and the cathode 16 to form a plasma arc i in the medium between protrusions 15 and 17. The arc i forms where the field is strongest by ionizing a portion of the medium near the inlet 18. In the disclosed embodiment, the electrical field is strongest in the region where the protrusion 15 on the anode 14 and the protrusion 17 on the cathode 16 converge at the inlet 18. The plasma arc i allows an electrical current to flow between the anode 14 and the cathode 16.

The current flow i in the electrodes induces the magnetic field B within the chamber 20. That portion of the magnetic field B oriented orthogonal to both the desired path of flow of the medium and to the plasma arc i interacts with the current i forcing the plasma arc i down the pumping chamber 20. Magnetic field B may contain nonorthogonal field components. These components, however, will not directly affect the operation of the pump. The plasma arc i forces the medium through the outlet 22 at a substantially higher pressure as the plasma arc i travels the length of chamber 20.

The pump 10 may be employed to ignite a combustible flowable medium. Combustion occurs in the chamber 20 beginning at the plasma arc i if the medium contains both an oxidizing agent, such as air, and a fuel. The plasma arc i forces the ignited medium through the outlet 22. If the medium contains only one of the components necessary for combustion, the one component may be ignited by pumping it into a combustion chamber containing the other; i.e., pumping fuel into oxidizer or oxidizer into fuel. The combined high pressure output of the pump 10 and the partial ionization of the medium from the plasma arc i will cause combustion once the oxidizer and fuel combine.

Figure 5:
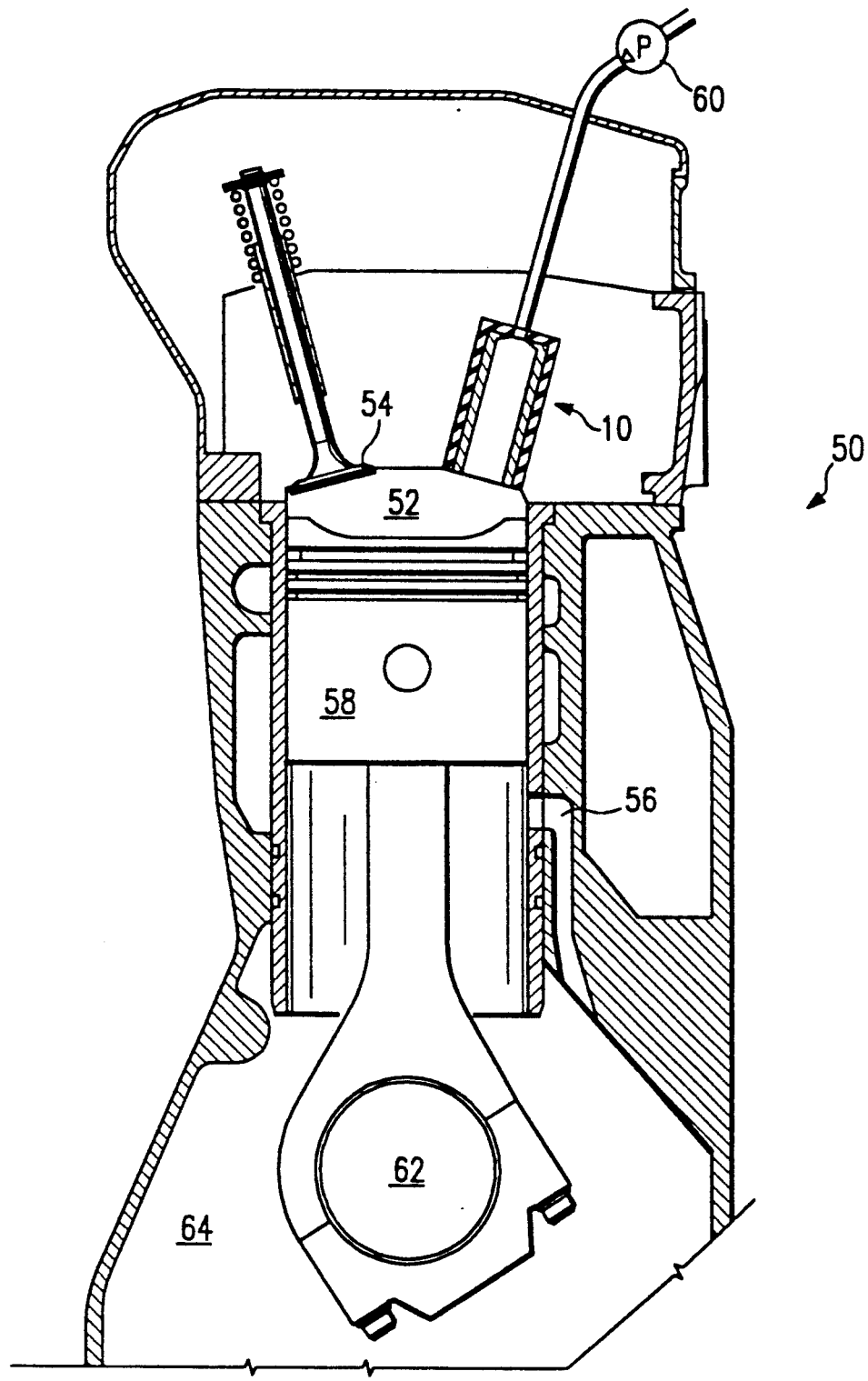
FIG. 5 discloses an application of the pump of FIG. 1 installed in an internal combustion engine.

FIG. 5 describes how the disclosed invention may be incorporated into an internal combustion engine 50. The engine 50 is illustrated having a piston 58 reciprocated by a crankshaft 62, as being a two-stroke crank-case scavenged diesel engine. The invention may be similarly incorporated in any two or four stroke internal combustion engine burning a liquid or gas hydrocarbon, pulverised coal, coal slurry, liquified biomass, or any other flowable combustible fuel.

A low pressure fuel pump 60 delivers diesel oil to pump 10. Pump 10 injects the oil at a pressure between 100 and several thousand psi into a combustion chamber 52 when the piston 58 is at or near the uppermost position in its stroke. The combustion chamber 52 already contains a compressed oxidizing agent, such as air, that ignites after combining with the compressed fuel forcing the piston 58 downward towards the crankshaft 62. An exhaust valve 54 opens to release spent hydrocarbons from the chamber 52 and closes. The continued downward motion of piston 58 drives crankshaft 62 and compresses the air within the crankcase 64. The compressed crankcase air is thereby forced into the combustion chamber 52 through a scavaging air passageway 56 while the top of the piston 58 is at or below the inlet to the passageway 56. The motion of other sequentially timed pistons or of a counterweight attached to crankshaft 62 (neither shown) causes the piston 58 to rise and compress the crankcase air thus preparing the combustion chamber 52 for a further injection of diesel oil from the pump 10. The pump 10 is also suitable for injecting fuels into non-reciprocating internal combustion engines such as Wankel rotary, turbojet, turbofan, turboprop, and turboshaft engines and into boilers.

The pump 10 may be modified to inject a fuel-oxidizing agent mixture into a combustion chamber by providing a second inlet 18 to pump 10 as in FIG. 2b.

Although the present invention has been described in detail, it should be understood that various changes, substitutions and alterations can be made hereto without departing from the spirit and scope of the invention as defined by the appended claims.

What is claimed is:

1. An apparatus for pumping a medium along a desired path of flow, comprising:
   means for creating a plasma arc in the medium orthogonal to the desired path of flow of the medium; and
   means for generating a magnetic field orthogonal to said plasma arc and orthogonal to the desired path of flow of the medium for moving said plasma arc along the desired path of flow of the medium.

2. The apparatus of claim 1 wherein said means for creating a plasma arc further comprises:
   a cathode and an anode aligned along the desired path of flow of the medium; and
   means for generating a current between said cathode and said anode.

3. The apparatus of claim 2 wherein said cathode and said anode further comprise:
   two elongate members each having first and second ends defined by the desired path of flow of the medium within the apparatus;
   each of said first ends located adjacent the beginning of the desired path of flow within the apparatus;
   each of said second ends located adjacent the end of the desired path of flow within the apparatus; and
   each of said first ends having a protrusion extending towards the other.

4. An apparatus for pumping a medium along a desired path of flow, said apparatus comprising:
   a hollow body including a chamber capable of accepting the medium;
   a cathode and an anode located in said body and aligned along the desired path of flow;
   means connected with said cathode and said anode for generating a plasma arc between said cathode and said anode; and
   means for generating a magnetic field orthogonal to the desired path of flow of the medium and orthogonal to said plasma arc to move said plasma arc along the desired path of flow.

5. The apparatus of claim 4 wherein said cathode and said anode further comprise:
   two elongate members each having first and second ends defined by the desired path of flow of the medium within the apparatus
   each of said first ends located adjacent the beginning of the desired path of flow within the apparatus;
   each of said second ends located adjacent the end of the desired path of flow within the apparatus; and each of said first ends having a protrusion extending towards the other.

6. An apparatus for injecting a combustible medium into a combustion chamber in fluid connection with said apparatus and for igniting the medium, said apparatus comprising:
  a hollow body including an inlet capable of accepting the medium and an outlet in fluid connection with the combustion chamber;
  a cathode and an anode located in said hollow body and aligned along the length of said body;
  means for generating a plasma arc between said cathode and said anode;
  means for generating a magnetic field orthogonal to said plasma arc and orthogonal to the desired path of flow of said medium; and
  means for igniting said medium.

7. The apparatus of claim 6 wherein said combustible medium is selected from the group of:
  liquid hydrocarbons, gaseous hydrocarbons, coal slurries, liquified biomasses, or hydrogen.

8. A method for pumping a medium along a desired path of flow, said method comprising steps of:
  creating a plasma arc in the medium orthogonal to the desired path of flow of the medium; and
  moving said plasma arc along the desired flow path of the medium by generating a magnetic field orthogonal to the plasma arc and orthogonal to the desired path of flow to the medium.

9. The method of claim 8 wherein the step of creating further comprises the step of creating a plasma arc in a liquid hydrocarbon orthogonal to the desired path of flow of the liquid hydrocarbon.

10. The method of claim 8 wherein the step of creating further comprises the step of creating a plasma arc in a gaseous hydrocarbon orthogonal to the desired path of flow of the gaseous hydrocarbon.

11. The method of claim 8 wherein the step of creating further comprises the step of creating a plasma arc in a coal slurry orthogonal to the desired path of flow of the coal slurry.

12. The method of claim 8 wherein the step of creating further comprises the step of creating a plasma arc in a liquified biomass orthogonal to the desired path of flow of the liquified biomass.

13. The method of claim 8 wherein the step of creating further comprises the step of creating a plasma arc in hydrogen orthogonal to the desired path of flow of the hydrogen.

14. The method of claim 8 wherein the step of creating a plasma arc further comprises passing a current between a cathode and an anode, the cathode and the anode aligned along the desired path of flow of the medium.

15. The method of claim 14 wherein the step of moving the plasma arc further comprises generating a magnetic field orthogonal to the plasma arc and orthogonal to the desired path of flow of the medium.

16. A method for pumping a medium along a desired path of flow comprising the steps of:
  placing the medium between a cathode and an anode aligned along the desired path of flow;
  generating a plasma arc between the cathode and the anode; and
  generating a magnetic field orthogonal to the desired path of flow of the medium and orthogonal to the plasma arc.

17. The method of claim 16 wherein the step of placing further comprises the step of placing a liquid hydrocarbon between a cathode and an anode aligned along the desired path of flow.

18. The method of claim 16 wherein the step of placing further comprises the step of placing a gaseous hydrocarbon between a cathode and an anode aligned along the desired path of flow.

19. The method of claim 16 wherein the step of placing further comprises the step of placing a coal slurry between a cathode and an anode aligned along the desired path of flow.

20. The method of claim 16 wherein the step of placing further comprises the step of placing a liquified biomass between a cathode and an anode aligned along the desired path of flow.

21. The method of claim 16 wherein the step of placing further comprises the step of placing hydrogen between a cathode and an anode aligned along the desired path of flow.

22. A method for injecting a combustible medium into a combustion chamber and igniting the medium, said method comprising the steps of
  placing the medium between a cathode and an anode aligned along the desired path of flow of the medium;
  generating a plasma arc between said anode and cathode;
  generating a magnetic field orthogonal to the plasma arc and orthogonal to the desired path of flow of the medium whereby the medium is injected into the combustion chamber; and
  igniting the combustible medium with the plasma arc.

23. The method of claim 22 wherein the step of placing further comprises the step of placing a liquid hydrocarbon between a cathode and an anode aligned along the desired path of flow of the liquid hydrocarbon.

24. The method of claim 22 wherein the step of placing further comprises the step of placing a gaseous hydrocarbon between a cathode and an anode aligned along the desired path of flow of the gaseous hydrocarbon.

25. The method of claim 22 wherein the step of placing further comprises the step of placing a coal slurry between a cathode and an anode aligned along the desired path of flow of the coal slurry.

26. The method of claim 22 wherein the step of placing further comprises the step of placing a liquified biomass between a cathode and an anode aligned along the desired path of flow of the liquified biomass.

27. The method of claim 22 wherein the step of placing further comprises the step of placing hydrogen between a cathode and an anode aligned along the desired path of flow of hydrogen.

* * * * *